United States Patent Office 2,935,529
Patented May 3, 1960

2,935,529

PROCESS FOR THE PRODUCTION OF HOMO-CYSTEINE COMPOUNDS

Hans Wagner, Konstanz, Germany, assignor to Deutsche Gold- und Silber-Scheideanstalt vormals Roessler, Frankfurt am Main, Germany No Drawing. Application December 9, 1957
Serial No. 701,366

Claims priority, application Germany
December 21, 1956

2 Claims. (Cl. 260—534)

The present invention relates to an improved process for the production of homocysteine compounds, particularly homocysteine and salts of homocysteine thiolactone.

The physiological and therapeutic significance of amino acids containing sulfahydryl groups is known. For example, cysteine hydrochloride has proved well suited for the treatment of liver damage. However, one disadvantage of this amino acid is that it is unstable and that it is at least partially converted to the inactive cystine in the presence of atmospheric oxygen. Also, because of its acid reaction, physiological difficulties arise in the use of cysteine hydrochloride.

It has now been found that salts of homocysteine thiolactone can be utilized with good success in place of cysteine hydrochloride in the treatment of liver damage. This thiolactone hydrolyses to homocysteine in the weakly alkaline blood medium.

It is known that homocysteine can be prepared by the demethylation of methionine in acid solution. In such process homocystine is produced first and this is converted to homocysteine thiolactone hydrochloride by reduction with tin or aluminum in the presence of hydrochloric acid. However, in this process methylmethionine sulfonium hydrosulfate is also produced as a by-product as can be seen from the following equation:

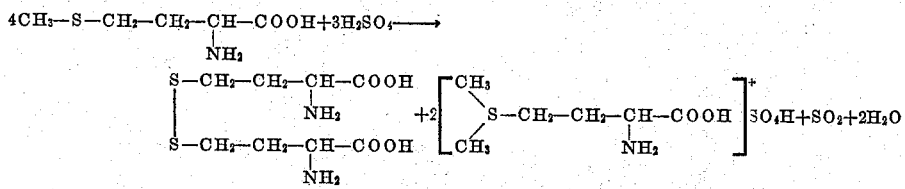

Therefore the yield of homocystine at best is only 50% of the theoretical. Also, in the following reduction of the homocystine to homocysteine thiolactone, yields of not over 80–85% of the theoretical can be obtained even when such reduction is carried out most carefully. Consequently, the total yield of homocysteine thiolactone is not over 35% of the theoretical based upon methionine. Furthermore, the purification of the homocysteine thiolactone produced by this process is difficult because of the large quantities of salt which are produced upon neutralization of strongly acidic solutions.

According to the invention it was unexpectedly found that homocysteine and salts of homocysteine thiolactone can be produced in a simple manner in good yields by treating methionine with metallic sodium or other alkali metal in liquid anhydrous ammonia whereby a sodium compound of homocysteine of the following formula is obtained:

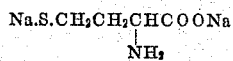

according to the following equation:

$$CH_3.S.CH_2.CH_2.CH.COOH + 3Na + NH_3 \longrightarrow$$
$$\underset{NH_2}{|}$$
$$Na.S.CH_2.CH_2.CH.COONa + NaNH_2 + CH_4$$
$$\underset{NH_2}{|}$$

Preferably, such reaction is carried out at low temperatures, for example, between —50° C. and 0° C. However, room temperature, i.e., about 20° C., and higher temperatures can be used if the reaction is carried out under sufficient pressure to maintain the ammonia in liquid form. If desired, the reaction can also be carried out in the presence of solvents which are inert to metallic sodium, such as, for example, open chained or cyclic ethers such as, for example, ethyl ether and dioxane.

It is surprising that this demethylation reaction can be carried out. Previously, it was only known that strong negative groups on sulfur, such as, for example, are present in benzyl methionine, could be split off in this manner.

The sodium compound of homocysteine thus obtained can then be converted to homocysteine or preferably a salt of homocysteine thiolactone by treatment with a non-oxidizing mineral acid, preferably after converting the excess sodium or alkali metal into a salt by treating the reaction mixture with an ammonium salt, preferably ammonium chloride, and distilling off the excess ammonia. Expediently the sodium compound of homocysteine is dissolved out of the resulting mixture with the aid of a solvent and the resulting solution acidified with an acid.

While homocysteine thiolactone salts, which are the preferred products of the process according to the invention in view of their greater stability, are easily obtained by treating the sodium compound of homocysteine with an excess of acid over that required to react with the sodium contained in the sodium compound of homocysteine, homocysteine itself can be obtained by careful neutralization of a solution of the sodium compound of homocysteine with an equivalent quantity of an acid such as hydrochloric acid or hydroiodic acid. Such neutralization preferably is carried out at temperatures below 20 to 25° C., and under exclusion of air, for example, under nitrogen, to prevent decomposition of the free homocysteine produced.

The following examples will serve to illustrate several embodiments of the process according to the invention.

Example 1

149 g. of d,l-methionine were introduced into a three liter long necked flask provided with a stirrer, a gas inlet tube and a filling tube. About 2500 cc. of ammonia were condensed in said flask under cooling with a mixture of methanol and Dry Ice. Thereafter 70 g. of sodium were introduced into such flask at a temperature of —40 to —50° C. over a period of 5 hours in the form of strips weighing about 1 g. Towards the end of the addition of the sodium the blue coloration (Na dissolved in ammonia) persisted. The mixture was stirred a total of 20 hours and thereafter the excess of sodium removed by addition of ammonium chloride and the ammonia was distilled off. The residue was dissolved in 1500 cc. of methanol and the solution acidified with about 300 cc. of concentrated HCl. The precipitated sodium chloride was filtered off and washed and the filtrate was evaporated to dryness in vacuum under $CO_2$. The residue was recrystallized from ethyl alcohol. A yield of 113 g. of d,l-homocysteine thiolactone hydrochloride having a melting point of 192–195° C. was obtained. The yield was 75% of the theoretical based upon methionine.

*Example 2*

3000 g. of d,l-methionine were introduced into a V2A pressure apparatus of about a 100 liter capacity provided with a stirrer and with a heating and cooling system. The temperature was reduced to −10° C. and thereafter about 50 liters of liquid ammonia were pressed into the apparatus from a storage container with the aid of nitrogen and the methionine dissolved therein with stirring. Then 1400 g. of sodium were introduced over an air lock over a period of about 5–6 hours into the ammoniacal methionine solution. The reaction proceeded at −5 to −15° C. The pressure in the apparatus rose to 20 atmospheres gauge pressure in view of the evolution of methane and this pressure was maintained constant with a regulating valve. After a further 12 hours the reaction ended and the ammonia and methane were distilled off. The residue was dissolved in about 25–28 liters of methanol and acidified with concentrated HCl. After removal of the precipitated NaCl, the filtrate was evaporated to dryness in vacuum under exclusion of air. The residue was recrystallized from ethyl alcohol. 2200 g. of d,l-homocysteine thiolactone hydrochloride of excellent purity having a melting point of 192–194° C. were obtained.

I claim:

1. A process for the production of a compound of the formula

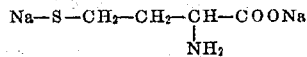

which comprises dissolving methionine in liquid ammonia, adding sodium to such solution in sufficient excess that a blue coloration of the solution persists and recovering the

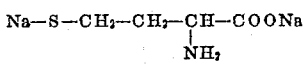

compound formed from the reaction solution.

2. The process of claim 1 in which said treatment is carried out at temperatures between −50° and +20° C.

References Cited in the file of this patent

F. E. Williams et al.: J. Am. Chem. Soc., vol. 53, pp. 352–356 (1931).

W. Theilheimer, Synthetic Methods of Organic Chemistry, S. Karger, Basel, Switzerland, vol. 6 No. 81, p. 29 (1952).

D. Greenberg: Amino Acids and Proteins, Charles C. Thomas, Springfield, Ill., page 870 (1951).

Byron Riegil and Vincent du Vigneaud: J. Biol. Chem., vol. 112, pp. 149–154 (1935).